(12) United States Patent
Sinker et al.

(10) Patent No.: US 11,781,414 B2
(45) Date of Patent: Oct. 10, 2023

(54) FILTRATION VESSEL

(71) Applicant: D & P INNOVATIONS SDN. BHD, Kuala Lumpur (MY)

(72) Inventors: Alastair Brenton Sinker, Hursley (GB); Dat Suan Goo, Kuala Lumpur (MY); Ky Anthony Doucet, Kuala Lumpur (MY)

(73) Assignee: D & P INNOVATIONS SDN. BHD, Kuala Lumpur (MY)

(*) Notice: Subject to any disclaimer, the term of this patent is extended or adjusted under 35 U.S.C. 154(b) by 393 days.

(21) Appl. No.: 16/982,327

(22) PCT Filed: Mar. 11, 2019

(86) PCT No.: PCT/GB2019/050664
§ 371 (c)(1),
(2) Date: Sep. 18, 2020

(87) PCT Pub. No.: WO2019/180406
PCT Pub. Date: Sep. 26, 2019

(65) Prior Publication Data
US 2021/0010364 A1    Jan. 14, 2021

(30) Foreign Application Priority Data

Mar. 20, 2018   (MY) .............................. PI2018000404

(51) Int. Cl.
*E21B 43/34*    (2006.01)
*B01D 21/26*    (2006.01)
(Continued)

(52) U.S. Cl.
CPC .............. *E21B 43/35* (2020.05); *B01D 21/00* (2013.01); *B01D 21/267* (2013.01); *E21B 43/40* (2013.01)

(58) Field of Classification Search
None
See application file for complete search history.

(56) References Cited

U.S. PATENT DOCUMENTS 4,779,677 A * 10/1988 Cobb ...................... E21B 43/34
166/267
6,640,901 B1 * 11/2003 Appleford ................. H02J 4/00
166/267
(Continued)

FOREIGN PATENT DOCUMENTS

GB         2 525 509         10/2016

OTHER PUBLICATIONS

International Search Report and Written Opinion dated May 29, 2019, in connection with International Application No. PCT/GB2019/050664, 12 pages.
(Continued)

*Primary Examiner* — Bradley R Spies
*Assistant Examiner* — Jeannie McDermott
(74) *Attorney, Agent, or Firm* — MCCRACKEN & GILLEN LLC

(57) ABSTRACT

The present invention relates to a modified MPD vessel which allows the coupling of identical secondary MPD vessels, which can house either sand filter and/or sand cyclonic MPD internals, to the vessel without the need for any vessel or pipework modifications whereby, a plurality of these MPD vessels can be further coupled using identical inlet and outlet configurations. This configuration of MPD vessels allows for improved means for removing produced solids from a hydrocarbon fluid stream and allows for a vastly more flexible system as a whole.

16 Claims, 12 Drawing Sheets

(51) Int. Cl.
*E21B 43/40* (2006.01)
*B01D 21/00* (2006.01)

(56) References Cited

U.S. PATENT DOCUMENTS

| | | | | |
|---|---|---|---|---|
| 2013/0126448 A1* | 5/2013 | McCabe | ............ | B01D 21/0084 |
| | | | | 210/801 |
| 2018/0283151 A1* | 10/2018 | Cook | ...................... | E21B 43/26 |
| 2018/0306018 A1* | 10/2018 | Renick | .................... | E21B 43/35 |
| 2018/0347334 A1* | 12/2018 | Martin | ............... | B01D 21/2427 |
| 2019/0178071 A1* | 6/2019 | Arefjord | ................. | E21B 43/35 |
| 2020/0141221 A1* | 5/2020 | Malone | .............. | B01D 17/0214 |

OTHER PUBLICATIONS

Anonymous: "Dual Pot Sand Filter", Retrieved by WIPO from the Internet, URL:http://eprocess-tech.com/wp-content/uploads/2016/10/Dual-Pot-Sand-Filter.pdf; retrieved on May 13, 2019, Oct. 1, 2016, cited in International Search Report and Written Opinion dated May 29, 2019, in connection with International Application No. PCT/GB2019/050664, pp. 1-2.

Anonymous: "Dual Pot Sand Filter", Retrieved by WIPO from the Internet, URL:https://www.slb.com/-/media/Files/testing/product sheets/surface/dual pot sand filter ps.pdf?la=en&hash=A71B00273C7A43F7B37CB7582401D3176516B7FF; retrieved on May 14, 2019, Jan. 1, 2011, cited in International Search Report and Written Opinion dated May 29, 2019, in connection with International Application No. PCT/GB2019/050664; pp. 1-2.

* cited by examiner

FILTRATION VESSEL

CROSS-REFERENCE TO RELATED APPLICATIONS

The present application is a United States National Stage Entry of Sinker et al., International Application No. PCT/GB2019/050664, entitled "FILTRATION VESSEL" and filed Mar. 11, 2019, which claims benefit of Malaysian Patent Application No. pi2018000404, filed Mar. 20, 2018. The entire contents of these applications are incorporated herein by reference.

FIELD OF THE DISCLOSURE

This invention relates to filtration vessels.

BACKGROUND OF THE INVENTION

In the upstream oil and gas industry, hydrocarbons are recovered from reservoirs which may be located deep underground; sometimes many hundreds or thousands of feet below the ground or below sea level. The recovery and production of hydrocarbon gas and crude oil fluids may be accompanied by the production of water and solid particles. The solid particles found within the recovered fluids may be a natural result of these particles seeping into the fluid stream from the formation surrounding the reservoir. These particles may also be inadvertently introduced into the fluid stream as a result of rock failure; these failures are typically caused by mechanical stresses induced in the rock by the completion of a well structure, for example, by drilling the mechanical framework of the well structure into place or by performing well maintenance operations. Rock failure may also occur naturally over time resulting in additional unwanted solid particles entering the fluid stream.

These solid particles are generally termed 'sand'; the production and removal of sand is a major challenge for the hydrocarbons industry for completing and producing oil and gas wells. For high pressure applications, up to about a 20 KPSI, MultiPhase Desanding (MPD) systems are typically used to remove the sand, and other solid particles, from the raw, recovered MultiPhase well fluids; these systems provide protection for equipment and processes carried out downstream of these wells.

In many cases, MPD systems are located upstream of the main well flow control element, known as a choke; solids found within the fluid stream could cause erosion and/or blockages of the choke and downstream processing equipment, and as such, the systems implemented upstream of the choke prevent these potential damaging and production limiting problems.

MPD systems can be categorised into three main types. These include the Sand Trap, Sand Filter and Sand Cyclone, with the latter two MPD systems receiving the most widespread use. The sand filter unit typically consists of a pair of tall, thin filtration vessels each housing a cylindrical filter screen element whereby, the recovered fluid or 'production flow' is fed through an inlet above the cylindrical screen. The production flow typically travels vertically down through the centre of the cylindrical screen, through the screen and exits the vessel via an outlet mounted on the side of the sand filter vessel. The passing of the production flow through the sand filter separates the sand particles from the production flow and traps them within the internal filter element.

As the trapped sand builds up on the filter element, known as the filter "cake", so too does the pressure induced on the filter element by the production fluid trying to pass through the filtered sand cake. Once the pressure drop across the sand filter reaches a pre-determined maximum value, the production flow is switched from the first vessel to the second vessel; these vessels are typically denoted as duty and standby vessels respectively. The former duty vessel is then isolated, depressurised and purged of the built up filtered sand typically using water to backflush the sand to a solids disposal point. These procedural steps are incurred again by the latter standby vessel once the production flow is reverted back to the original duty vessel, in the same way as delineated above, and the cycle begins again.

The most efficient MPD system is the Sand Cyclone. Here, sand removal is achieved by virtue of a pressure drop across the cyclone element. A solid laden production flow is forced under pressure into the inlet section of the cyclone element via a tangential inlet port. This, together with the presence of a gas phase, causes the production flow to spin at a very high velocity creating a high G radial acceleration field. As the sand particles are the densest particles present in the production fluid, they are forced radially outwards towards the cyclone structure inner wall. These sand particles are ejected from the bottom of the cyclone element due to internal phase-dynamic forces; the remaining sand free production flow exits from the vortex finder of the cyclone via an axial outlet atop the cyclone vessel.

The separated solids from the sand cyclone are collected in a solids accumulator which can be periodically purged to remove solids from the system; these accumulators can be either separate from, or integrated with, the sand cyclone vessel. A separate accumulator vessel is coupled to the bottom of a sand cyclone vessel and allows the separated solids to build-up within its cavity; it is periodically emptied by closing valves between the two vessels, to isolate the lower accumulator from the upper sand cyclone vessel, depressurising and flushing the accumulator, typically with water to transfer the stored, separated solid particles to another solid handling system. During this procedure, the sand cyclone vessel remains 'online' and permits a build-up of solid particles at the bottom of the sand cyclone vessel while the accumulator is purged before being re-coupled to the sand cyclone vessel and allowing the built up solid particles to simply 'drop' into its cavity. In this way, the separate accumulator design only requires one sand Cyclone vessel and does not require the duty/standby setup mentioned previously for the sand filters.

The configuration of the integrated accumulator design is identical to that of the separate accumulator design but without the separate accumulator vessel; the solids accumulator volume is accommodated in the lower region of the sand cyclone vessel. Here, the sand cyclone vessel is purged by one of the two ways. Either it is done 'offline' with an additional sand cyclone vessel in the duty/standby fashion, or, it is done 'online' at the operating pressure using a downstream high integrity sacrificial choke valve. Purging an integrated accumulator design in the latter 'online' fashion is typically not a recommended practice due to safety issues concerning the depressurisation of a high concentration sand slurry over a high differential pressure using a single valve; this can cause the valve to be washed out very quickly and could risk an open path for high pressure hydrocarbons to the local environment.

The Sand Management Systems (SMS) market has changed under the low oil price environment; operators and service providers are under pressure from both economic and time constraints and increasing competition while at the same time attempting to accommodate increasingly onerous client work scopes. In light of this, SMS tools which the service providers use to implement this type of work must change to accommodate these new demands mentioned above.

The conventional SMS give rise to a plurality of issues experienced by the service providers. Firstly, to be able to meet the differing operational requirements and the preferences of different clients, SMS service providers must usually maintain an equipment inventory of discrete sand filter and sand cyclone packages which conventionally are extremely cumbersome, logistically awkward and commercially expensive.

Although conventional sand cyclone desanding equipment, specified with separate accumulators remain relatively compact with regard to footprint, they are too tall to transport upright and so must be transported either horizontally or as separate submodules; for land based applications, this implies that a crane or hoist trailer must be 'onsite' to either upright the complete equipment to its vertical position or assemble the stacked sub modules to their vertical coupled state which is a necessity for their subsequent operation.

Conventional sand cyclone desanding equipment is usually time consuming to maintain and configure; access to cyclonic internals typically requires the removal of (i) the main process outlet pipework which is always at high level and can represent a personnel safety issue, and (ii) the inlet pipework as well in some cases, to allow access and the removal of the vessel internals.

Conventional sand filter and sand cyclone desanding equipment have specific maximum capacities or 'throughputs'; to accommodate applications which demand higher throughputs than the available inherent maximum capacities of these conventional SMS equipment, either multiple skids, all with full isolation valve sets, need to be connected in parallel with 'off-skid' pipework or bespoke large capacity SMS equipment needs to be constructed specifically for these rarer cases, incurring capital spend and lead time.

High Pressure sand filter screen designs are typically 'in-to-out', whereby the production flow travels from the central region of the filter element to the outside of the filter element as opposed to 'out-to-in' designs where the flow direction is the reverse. This results in a rapid build-up of filtered sand within the central filter element region requiring high solids purging frequencies of the sand filter during operating periods where the solid production rates are high.

GB 2 525 509 discloses a cyclone sand filter apparatus and a method for the conversion thereof from a sand filter to a cyclone filter comprising the steps of removing an end cap of the sand filter vessel, removing the filter element, replacing the cap with an extra housing comprising a cyclone unit and connecting the housing to the vessel.

The present invention aims to overcome or at least ameliorate one or more of the problems set out above.

SUMMARY OF THE INVENTION

The present invention relates to a modified MPD vessel which allows the coupling of identical secondary MPD vessels, which can house either sand filter element or a sand cyclone element, to the primary vessel without the need for any vessel or pipework modifications whereby, a plurality of these MPD vessels can be further coupled using identical inlet and outlet configurations. This configuration of MPD vessels allows for improved means for removing produced solids from a hydrocarbon fluid stream and allows for a vastly more flexible system as a whole.

According to the first aspect of the present invention, there is provided a MPD vessel for use with MultiPhase Desanding (MPD) systems, wherein the MPD system is typically but not limited to either a sand filter and/or a sand cyclone filter.

The present invention has been modified with respect to a conventional MPD vessel to allow for a standardised inlet/outlet configuration which can be coupled with additional MPD vessels and a central valve manifold without any integral MPD vessel pipework modifications. Additionally, the present invention does not require 'on skid' or 'off skid' modification to allow the mounting and coupling of either a sand filter element or cyclonic filter element within its vessel housing.

A conventional sand cyclone desander vessel comprises an outlet proximate to its top cover portion with the top cover portion comprising a bolted flange. In the present arrangement, the same outlet has been relocated to the side of the MPD vessel leaving a free access top cover which can, for example, either be a bolted blind flange or an ACME screw thread top cover; this modification allows for a sand cyclone or sand filter element mounted within the MPD vessel to be swapped simply and quickly without the need for dismantling any pipework, which is an unattainable feat with a conventional sand cyclone desander vessel. As the present invention can be coupled with either type of desanding element without the need for pipework modifications, with this outlet modification, the MPD vessel permits simple and quick swaps for both types of internal component without the need for pipework modifications. It will be noted that prior art equipment cannot accommodate either a cyclonic internal or filter internal without a modification to, or dismantling of, some pipework. Although in the prior art, there are filters in which the filter internal can be changed without any pipework modification (i.e. free top cover) they cannot also accommodate a cyclonic internal component without pipework modification.

To accommodate this structural relocation of the process outlet from the top to the side of the MPD vessel, the present invention further comprises a redesigned internal seal interface, in particular, to allow for this relocated outlet connection. In conventional sand cyclone desanding vessels, two body pressure seals are required for the sand cyclone element to isolate the inlet, the solids outlet and the desanded outlet from each other. The seal which normally isolates the inlet from the desanded outlet is housed in the vessel axial top flange assembly. In the present arrangement, this seal is preferably relocated further down the vessel to the body of the cyclonic internal, just above the inlet port. This creates a chamber or zone above this seal but still within the body of the MPD vessel, which accommodates the desanded outlet stream and to which the side exit port from the vessel for this desanded outlet stream is located. From a sand cyclone element mounted within a conventional sand cyclone vessel, the present arrangement is thus redesigned so that when the MPD vessel is coupled with a sand cyclone element, rather than routing the desanded outlet flow directly to the outlet pipework, it discharges it into the desanded outlet region within the vessel which allows it to exit the vessel via the side port.

The above modification allows the present arrangement to fully accommodate either a sand filter or sand cyclone element without the need for vessel or pipework modification by standardising the internal seal interface design within the MPD vessel to ensure the commonality between the sand filter element and sand cyclone element seals. The repositioning of the internal upper seal within the cyclonic desander vessel, that pressure-isolates the inlet from the desanded outlet stream from a zone within the axial flanged outlet to a location just above the inlet port, allows the two internal seals to be in an orientation which is more akin to the internal seal orientation required for a sand filter element to be mounted and successfully coupled within a sand filter vessel. This allows the internal seals for both the sand filter element and sand cyclone elements to be identical, ensuring that the MPD vessel can be coupled to either sand filter or sand cyclone elements without the need for any pipework modification, giving the MPD vessel a multi-use design.

The present arrangement may further comprise vessel pipework that has been configured to allow for the MPD vessel to be 'uni-sided', i.e. does not comprise right or left orientation dependences and thus can be substituted for use in both operational orientations. This allows for simpler and more efficient inventory storage of the present arrangement over conventional SMS vessels.

In some embodiments, two MPD vessels are coupled together using a central valve manifold which is connected in-between the two MPD vessels; this central valve manifold has been configured to provide the standardised inlet and outlet connections, the flow routing control and isolation functions associated with the duty/standby, parallel or series operation desanding setup. This filtration setup can be manufactured as a complete, fully integrated single skid design where, the setup may comprise, but is not limited to, two MPD vessels which can be configured as two sand filters, two cyclonic filters or a combination of the two different separation techniques.

In some embodiments, the MPD system setup can be manufactured as a multi-skid design wherein, each MPD vessel and the central valve manifold are mounted within their own dedicated skid structures. This embodiment may allow the present invention to be used for offshore applications where, the weight of each unit must be considered and ensured to abide by the maximum weight limit permitted by cranes, by which, these units will be lifted.

In further embodiments, additional MPD vessels may be added to the MPD setup described above. Here, a single MPD vessel can be 'daisy-chained' to one or both sides of the MPD system setup by coupling each additional MPD vessel to each of the MPD vessels already engaging the central valve manifold using 'quick' pipe links; this can be achieved without the need for additional valving as a result of the integral uniform pipework configuration each MPD vessel embodies.

The additional 'daisy-chained' MPD vessels coupled to the MPD system setup permit increased production flows to be realised, while increasing the solids holdup capacity during operation which reduces the required solids accumulator purging frequency of separated solids, without the need for introducing an entire additional MPD system setup and manifolding it in parallel to the original system. Coupling an entire additional MPD system setup to the original system remains complex, time consuming and demanding on work and storage space and operator resource.

Further embodiments of the present invention may use a tangential inlet, which is typically coupled with a sand cyclone element, to improve the performance of the sand filter. Here, the sand filter internal comprises a concentric outer cylinder, termed the 'Swirl Tube', which encloses the smaller diameter, inner concentric central filter screen; the annular cavity between the outer and inner concentric cylinder portions of the sand filter is called the 'Swirl Zone'.

The production flow enters the MPD vessel, via the tangential inlet, into the sand filter and is directed into the Swirl Zone; the concentric nature of the outer cylinder of the sand filter causes the production flow to begin 'swirling' around the inner central filter screen. The larger solid particles are forced radially outwards towards the Swirl Tube wall by the centripetal forces created by the induced swirling flow.

The separated large solid particles exit the Swirl Tube via the bottom plane of the Swirl Tube and settle in the MPD vessel's integrated solids accumulator. Thus, the Swirl Tube provides a bulk 'pre-treatment' process to the entire filtration process which significantly reduces the build-up of solids on the outer surface of the inner central filter screen thereby, increasing the solid handling capacity of the sand filter while reducing the required purge frequency of the filter. This pre-treatment occurs in a single step, within the sand filter structure, which differs from conventional pre-treatment methods which typically occur in two separate, distinct stages.

Thus, the present invention may provide apparatus which is modular, standardised, configurable, easy to use, economic, highly efficient and with expanded capabilities over the more conventional sand filtration and cyclonic filtration vessels and systems.

BRIEF DESCRIPTION OF THE DRAWINGS

Embodiments of the invention will now be described, by way of example, with reference to the drawings in which.

DETAILED DESCRIPTION

Figure 1:
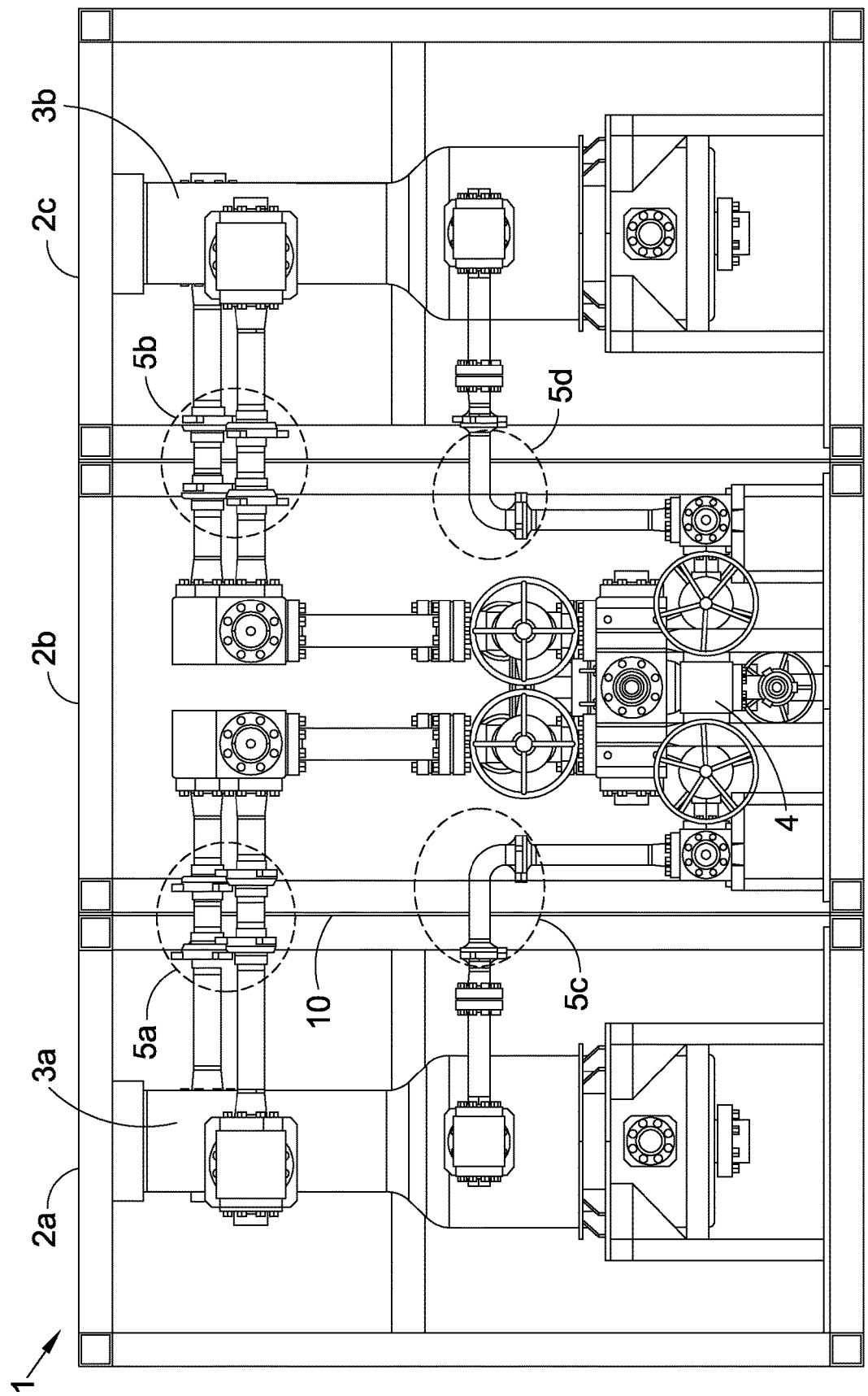
FIG. 1 is a schematic longitudinal sectional view showing a multi-skid design comprising two MPD vessels and a central valve manifold, all on separate sub skids.
Figure 2:
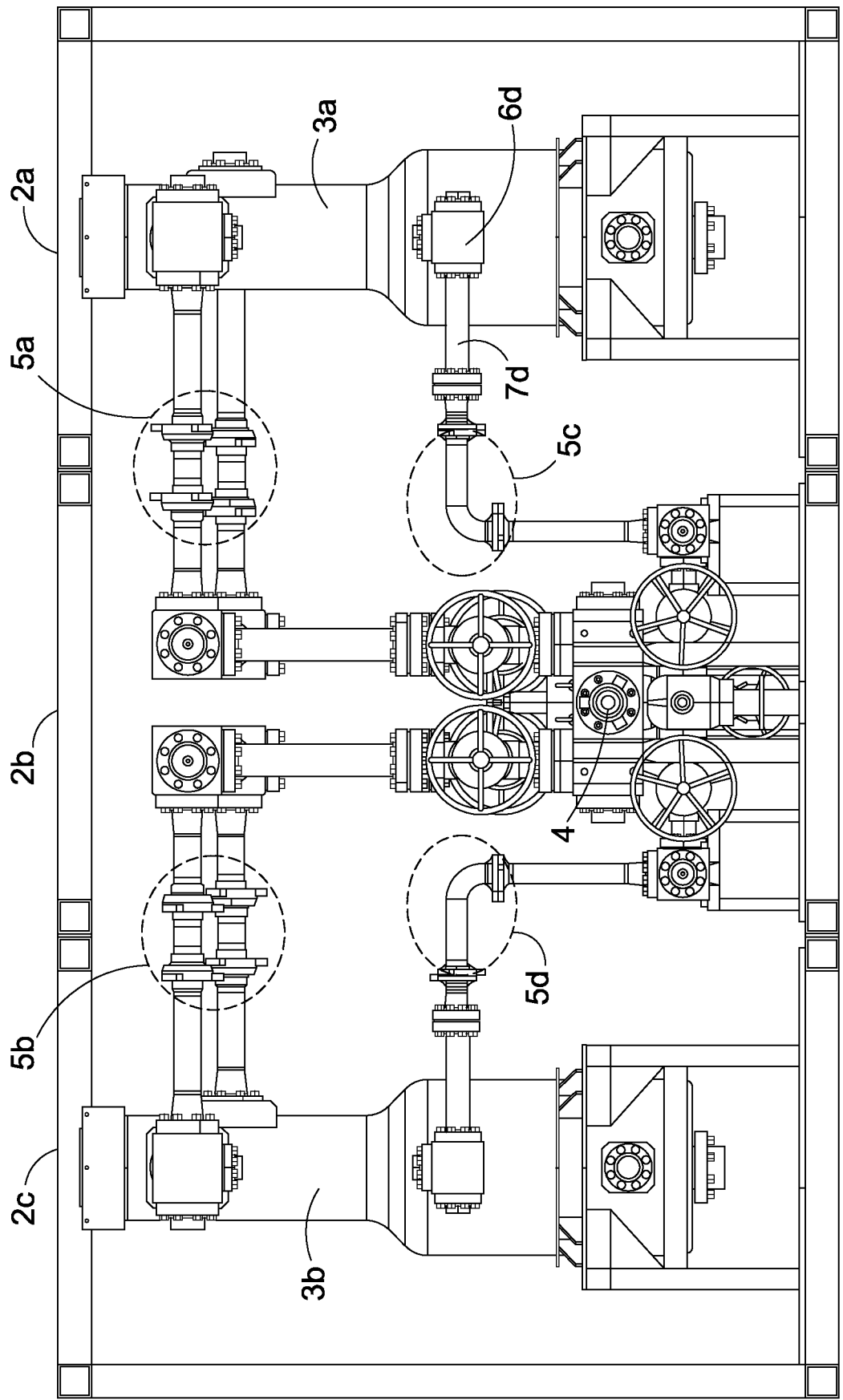
FIG. 2 is a schematic longitudinal sectional view showing the rear view of a multi-skid design comprising two MPD vessels and a central valve manifold, all on separate sub skids.

With reference to FIGS. 1 and 2, a multi-skid system 1 design for the desanding of a hydrocarbon fluid stream carries two MPD vessels 3 which are coupled together through a central valve manifold 4.

Here, the skids 2 are used to house each element of the multi-skid system 1, with the elements either being, but not limited to, a MPD vessel 3 or central valve manifold 4. The skid 2 provides a structurally stable framework and housing for the elements mounted within it. The skid 2 not only allows for easier manipulation of the elements, for example by a crane, but also permits simpler, more efficient and less time-consuming transport and storage of these elements.

Each central valve manifold 4 is directly couplable to two MPD vessels 2 via inter-skid connections 5 made between each vessel 3 and the manifold 4. The inter-skid connections 5 are made between each MPD vessel 3 and central valve manifold 4 independently, to connect the necessary and complementary pipework together and each pair of complementary pipework, from the MPD vessel 3 and central valve manifold 3, converges at the skid interface 10 where they are subsequently connected via the inter-skid connections 5.

The inter-skid connections 5 successfully couple each MPD vessel 3 to the central valve manifold 4 allowing the multi-skid system 1 to function in the manner of a duty/standby MPD system wherein, the MPD vessel 3a would be implemented as either the duty or standby vessel and the other MPD vessel 3b would be implemented as the opposite standby or duty vessel, with the central valve manifold 4 controlling the flow routing and isolation functions associated with the duty/standby desanding setup. The skilled person will understand that other operational configurations are possible such as a 2×50% parallel configuration or with an extra link, both vessels operational in series.

Figure 3:
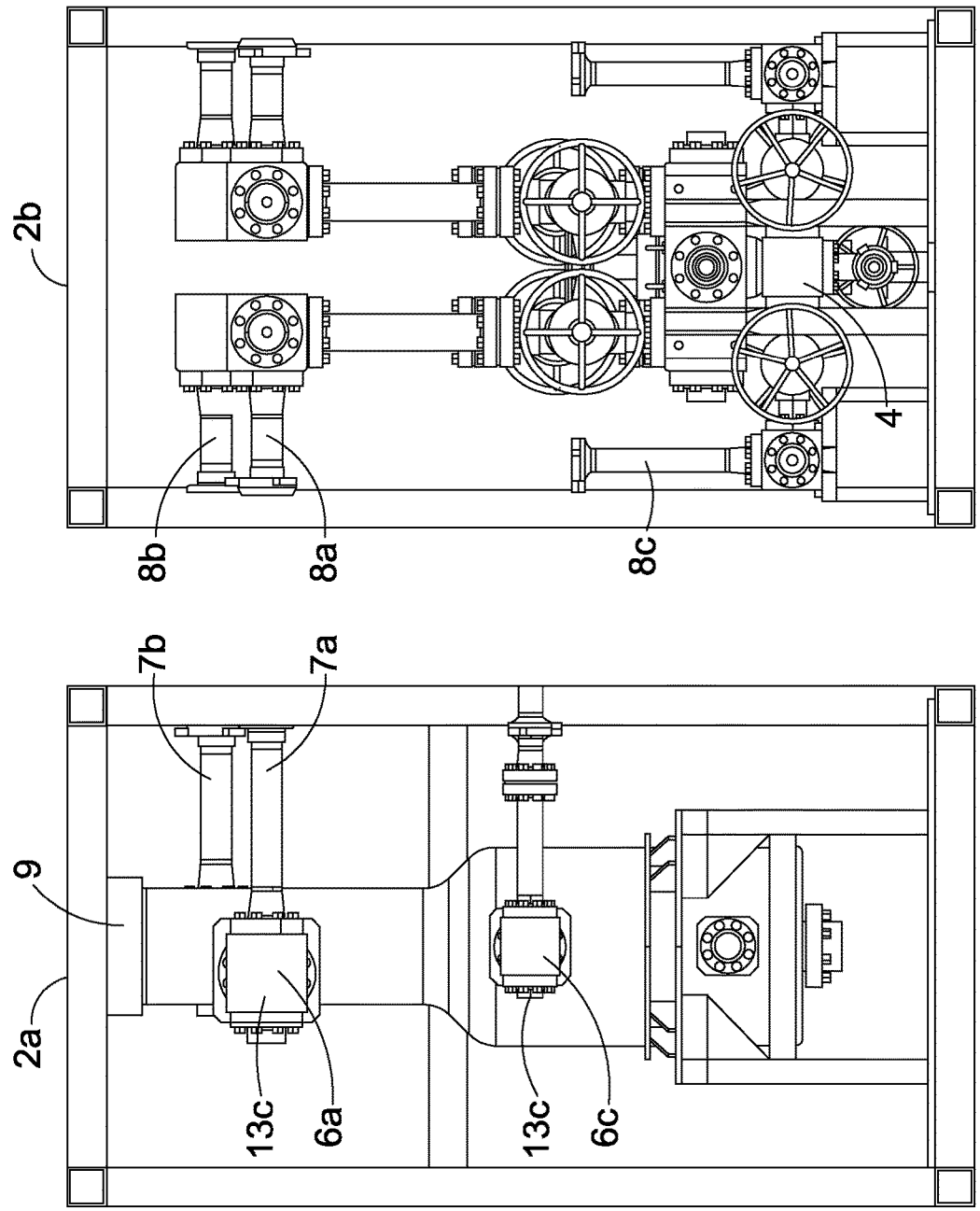
FIG. 3 is a schematic longitudinal sectional view showing a MPD vessel and central valve manifold with inter-skid connections disconnected.

With reference to FIG. 3, the inter-skid connections 5 between both MPD vessels 3 and central valve manifold 4 have been removed and one of the MPD vessels 3b has been removed from view. The MPD vessel 3 is now uncoupled from the central valve manifold 4 showing how each element is separately stored and or stacked together/upon one another before being brought together as a complete multi-skid system 1 on site.

Advantageously, the MPD vessel 3 has, but is not limited to, a modified screw top cover portion 9 which allows for quick and easy access to the sand filter or cyclonic internal mounted within the vessel 3 without the need to dismantle any internal pipework wherein, modification involves replacing a less flexible conventional bolted flange with the top cover portion 9. This beneficial modification is made possible due to the additional modification of relocating the vessel process outlet 7b from the top of the MPD vessel 3, which passed through the top cover portion 9, to the side of the MPD vessel 3; shown by FIG. 3. (A standard bolted blind flange is also used in some cases as screw caps are not permitted in some regions—e.g. Saudi. A key point is the move of the outlet pipework from the top of the vessel to the side to unburden the access cover which could be either a screw cap or bolted flange).

Conventional MPD vessels require integral pipework modifications in order to replace a sand filter element, mounted and coupled within it, with a sand cyclone element and vice versa; no further integral MPD vessel pipework modifications are needed in replacing one type of solids separation technique, mounted and coupled within the MPD vessel 3, with another type of solids separation technique.

With reference to FIG. 3, the MPD vessel 3 further comprises four vessel connectors 6 which are connectable to the different vessel inlet/outlet connections 7. Each vessel connector 6 is integrally mounted onto the MPD vessel 3 and comprises two external apertures, for the connection of the vessel inlet/outlet connections 7, which allows bi-directional flow to the MPD vessel 3.

The process inlet connector 6a and process outlet connector 6b are mounted either side of the MPD vessel 3, proximate the top cover portion 9, such that the subsequent connections made to the vessel inlet/outlet connections 7 may exit the skid 2 housing unobstructed and aligned with the corresponding central valve manifold inlet/outlet connections 8. The flush water inlet connector 6c and slurry outlet connector 6d are mounted to the MPD vessel 3 in a similar fashion, proximate to the lower end of the MPD vessel 3. In this way, the production flow can enter the MPD vessel 3 from the vessel side, vessel process inlet 7a, through the tangential inlet to access the separation element mounted within the vessel 3, which is required for the desanding process.

The vessel process inlet 7a is connected to the process inlet connector 6a, the vessel process outlet 7b to the process outlet connector 6b, the vessel flush water inlet 7c to the flush water inlet connector 6c and the vessel slurry outlet 7d to the slurry outlet connector 6d. Each of the vessel inlet/outlet connections 7 occupy one of two apertures provided by the vessel connectors 6, with the remaining aperture being sealed by way of a blind flange 13. In this way, when the MPD vessel 3 is coupled to the central valve manifold 4, via the inter-skid connections 5, the process flow travelling to and from the MPD vessel 3 will not be able to exit from the blind flange 13. The order in which the vessel inlet/outlet connections 7 are connected to the vessel connectors 6 does not matter for the successful subsequent operation of the multi-skid system 1.

Figure 4:
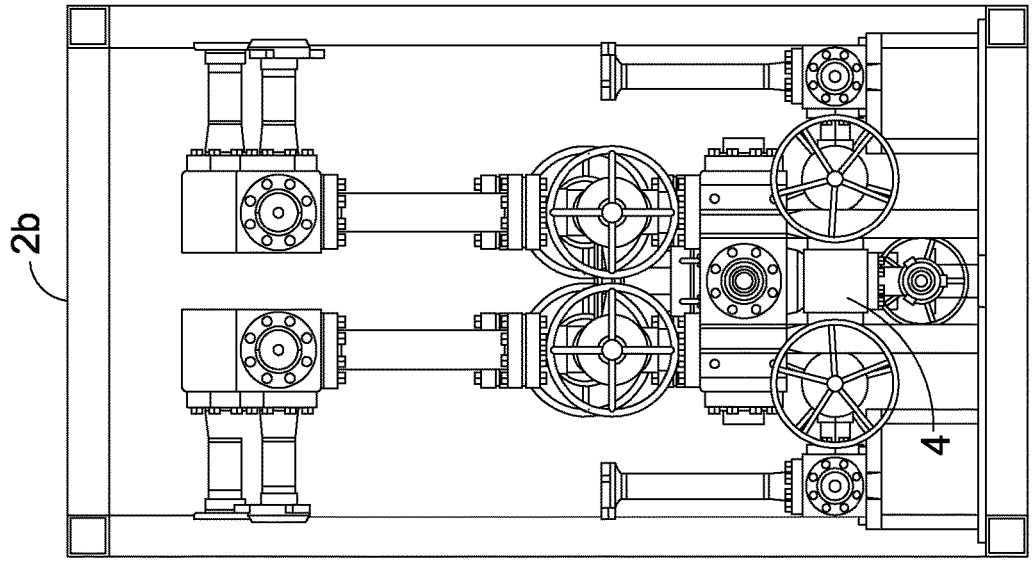
FIG. 4 is a schematic longitudinal sectional view showing the first stage of the reversal of the filtration connections.
Figure 4:
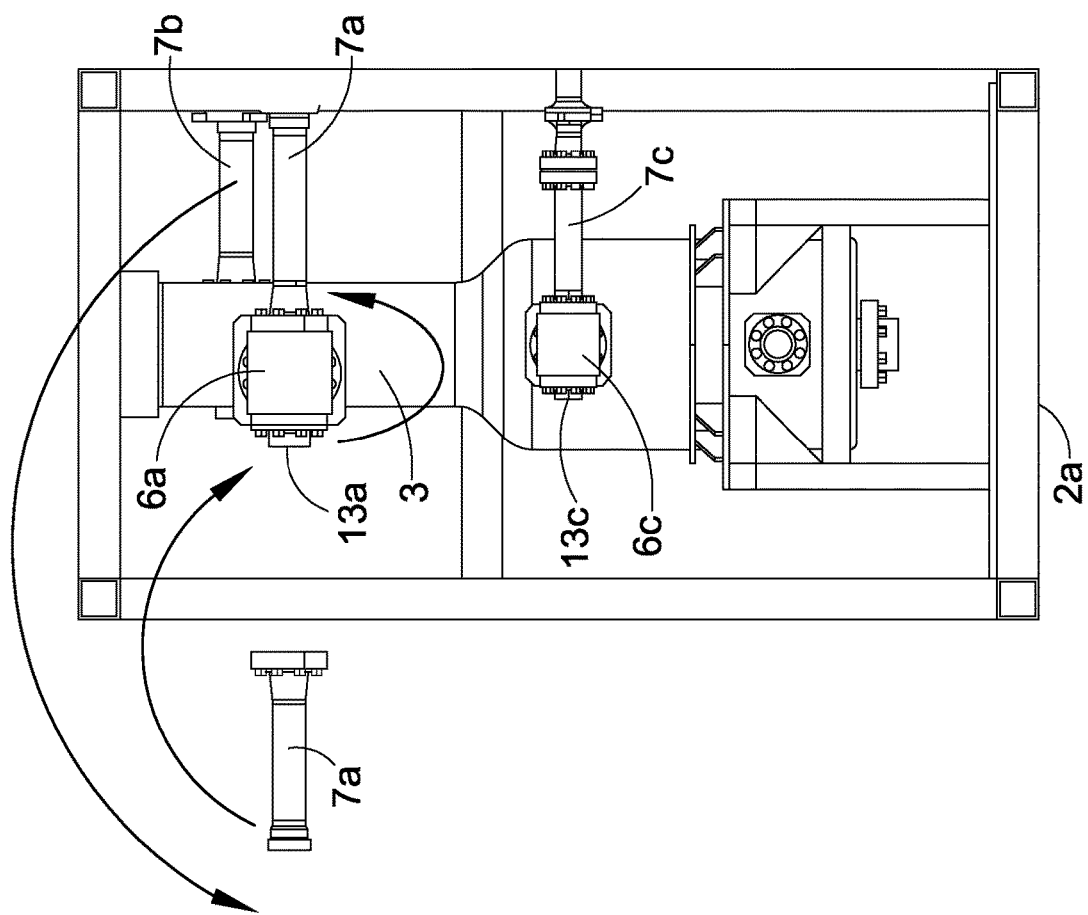

With reference to FIG. 4, the connected vessel inlet/outlet connections 7 can easily be disconnected and reconnected to the opposing aperture of the vessel connectors 6, which inverts the orientation of the previously connected MPD vessel 3. The vessel process inlet 7a is removed from the process inlet connector 6a, inverted and reconnected to the opposing aperture on the connector 6a; the sealed aperture must first be unsealed, by removing the blind flange 13, before the vessel process inlet 7a may be attached to it. Here, the blind flange 13 is now used to seal the previously occupied aperture of the process inlet connector 6a. As the MPD vessel 3 comprises a tangential input port 18, when inverting the orientation of the vessel inlet/outlet connections 7 from right to left, the process inlet connector 7a must be replaced with a shorter variant as to accommodate the tangential nature of the inlet port 18 of the MPD vessel 3.

Advantageously, modifying the required pipework inlet/outlet configuration to the symmetrical, side mountable four pipe configuration as described above allows for fast and simple implementation of the vessel inlet/outlet connections 7 to a MPD vessel 3 without the need for further 'on-skid' pipework modifications wherein, 'on-skid' pipework modifications are typically done to conventional desanding systems 'on-skid' to modify a MPD vessel to allow the replacement and coupling of a different type of separation element. Thus, the vessel inlet/outlet connections 7 are able to be coupled to both the sand filter and sand cyclone units without modification.

Figure 5:
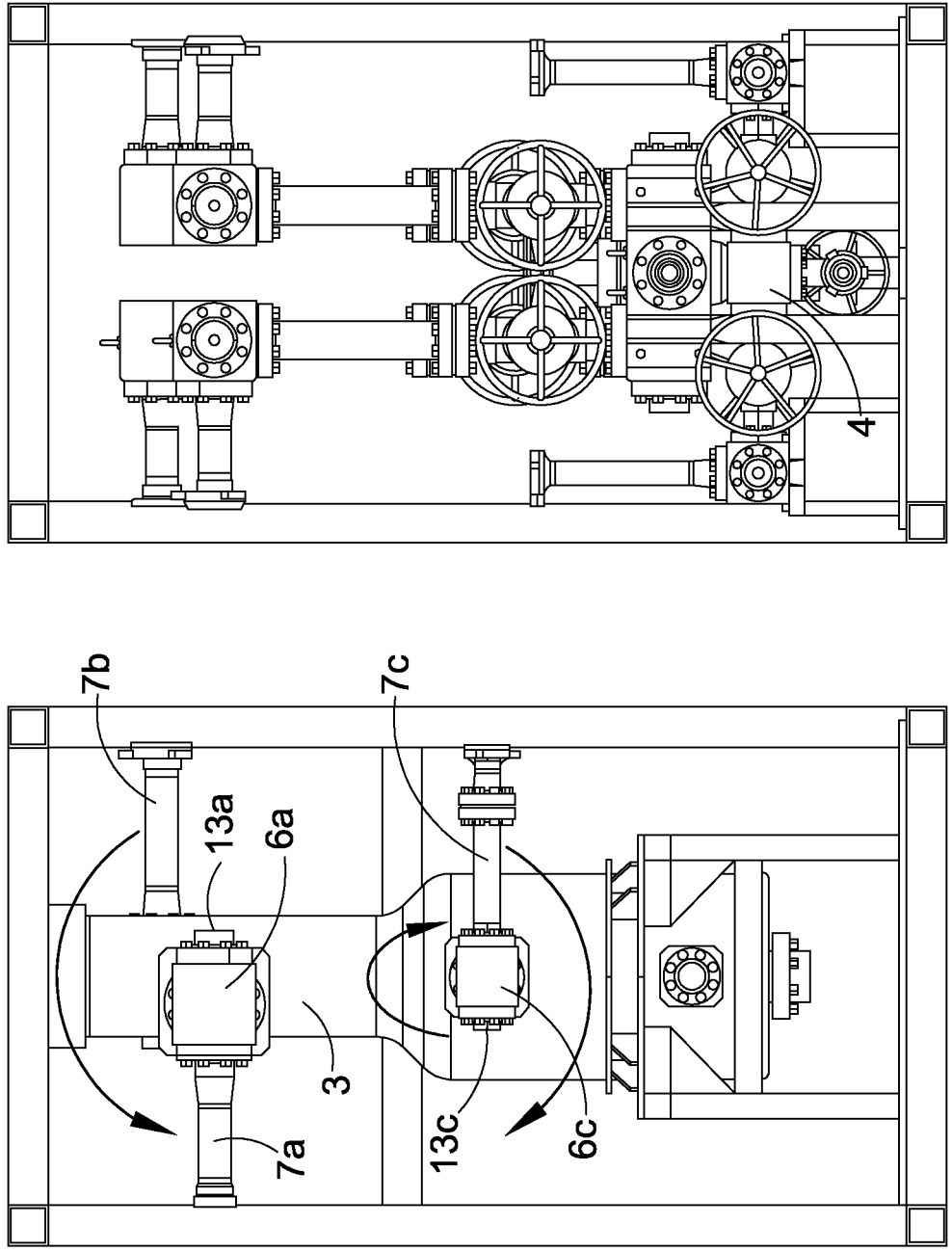
FIG. 5 is a schematic longitudinal sectional view showing the second stage of the reversal of the filtration connections.
Figure 6:
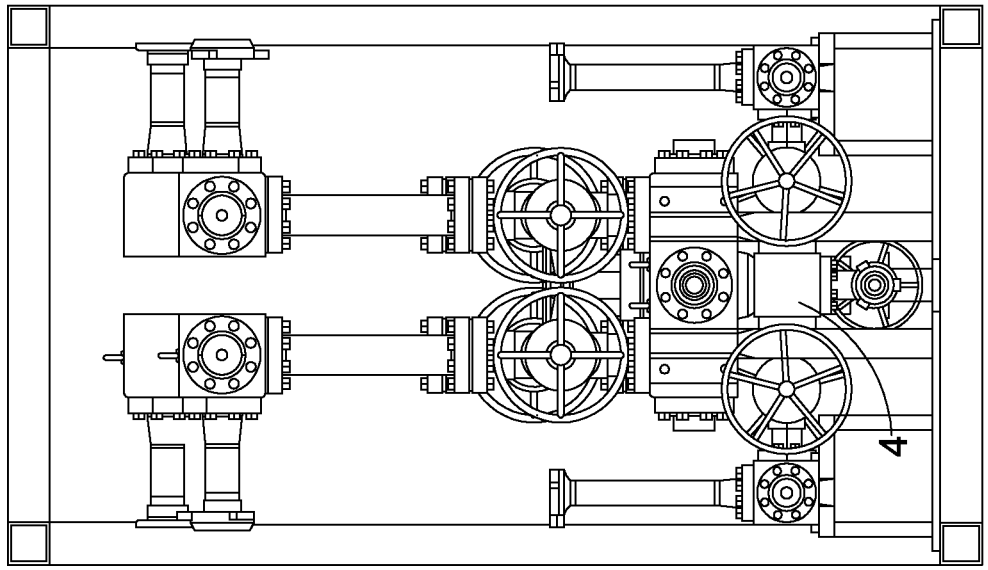
FIG. 6 is a schematic longitudinal sectional view showing the final stage of the reversal of the filtration connections.
Figure 6:
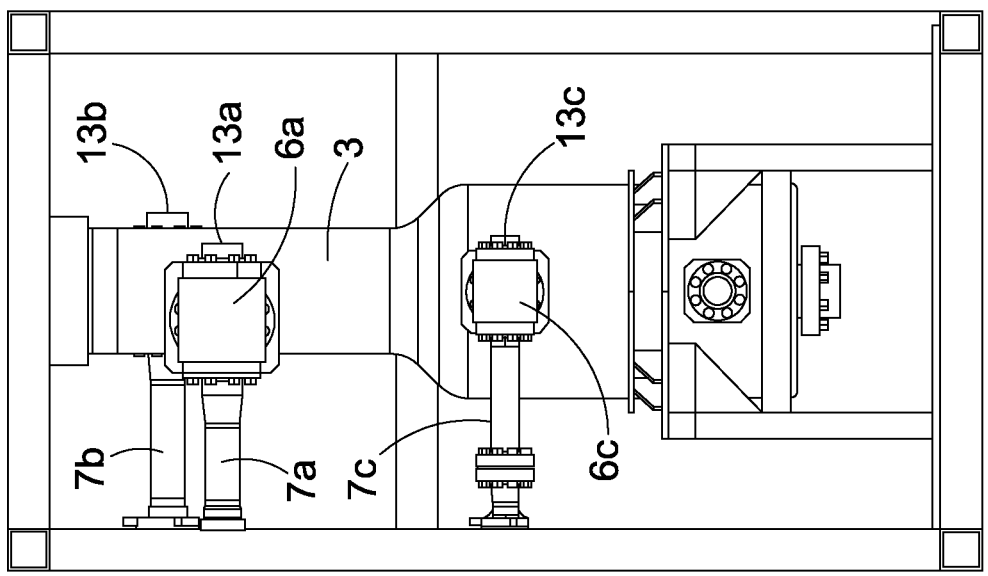

FIG. 5 shows the sequential reconnection process carried out for each of the remaining three vessel inlet/outlet connections 7: the vessel process outlet 7b, the vessel flush water inlet 7c and the vessel slurry outlet 7d. FIG. 6 shows inversion of the MPD vessel's 3 orientation by reconnecting the vessel inlet/outlet connections 7. In this way, the MPD vessel 3 can be considered uni-sided allowing it to be stored, manipulated and function independent of any orientation dependencies which can be experienced by conventional MPD vessels.

Figure 7:
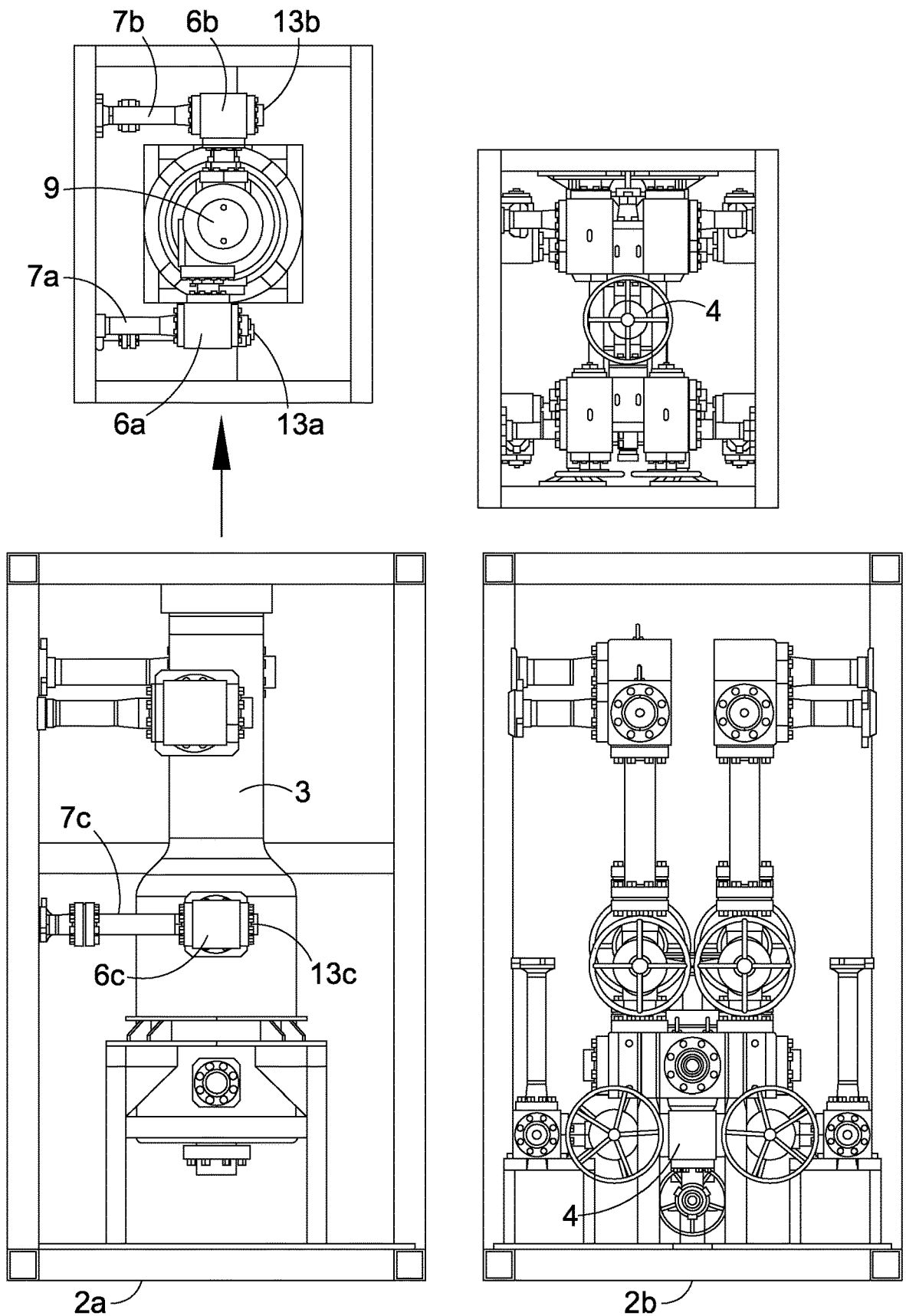
FIG. 7 is a schematic longitudinal sectional and plan view showing a first movement of the MPD vessel to the opposite side of the central valve manifold.
Figure 8:
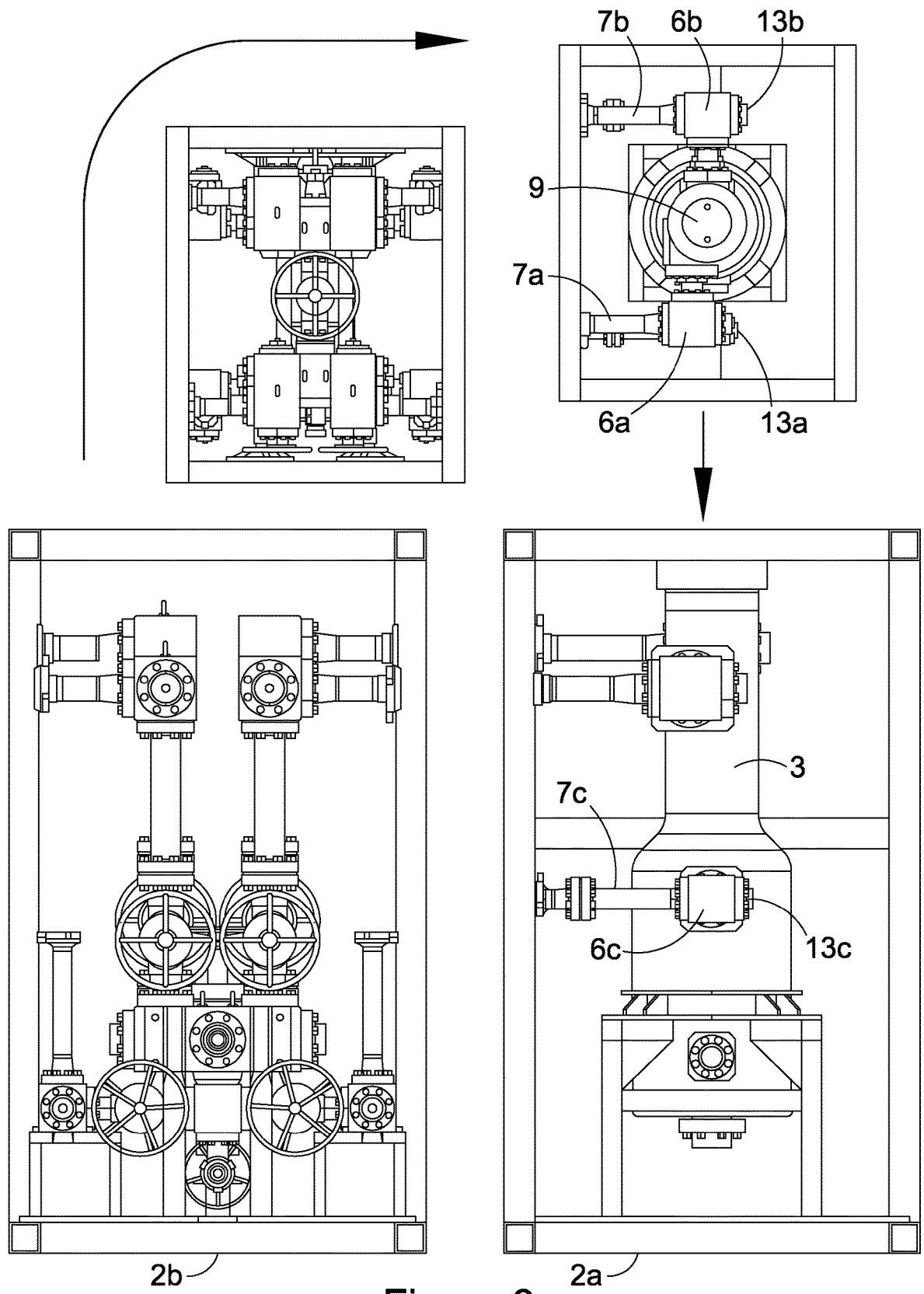
FIG. 8 is a schematic longitudinal sectional and plan view showing a second movement of the MPD vessel to the opposite side of the central valve manifold.
Figure 9:
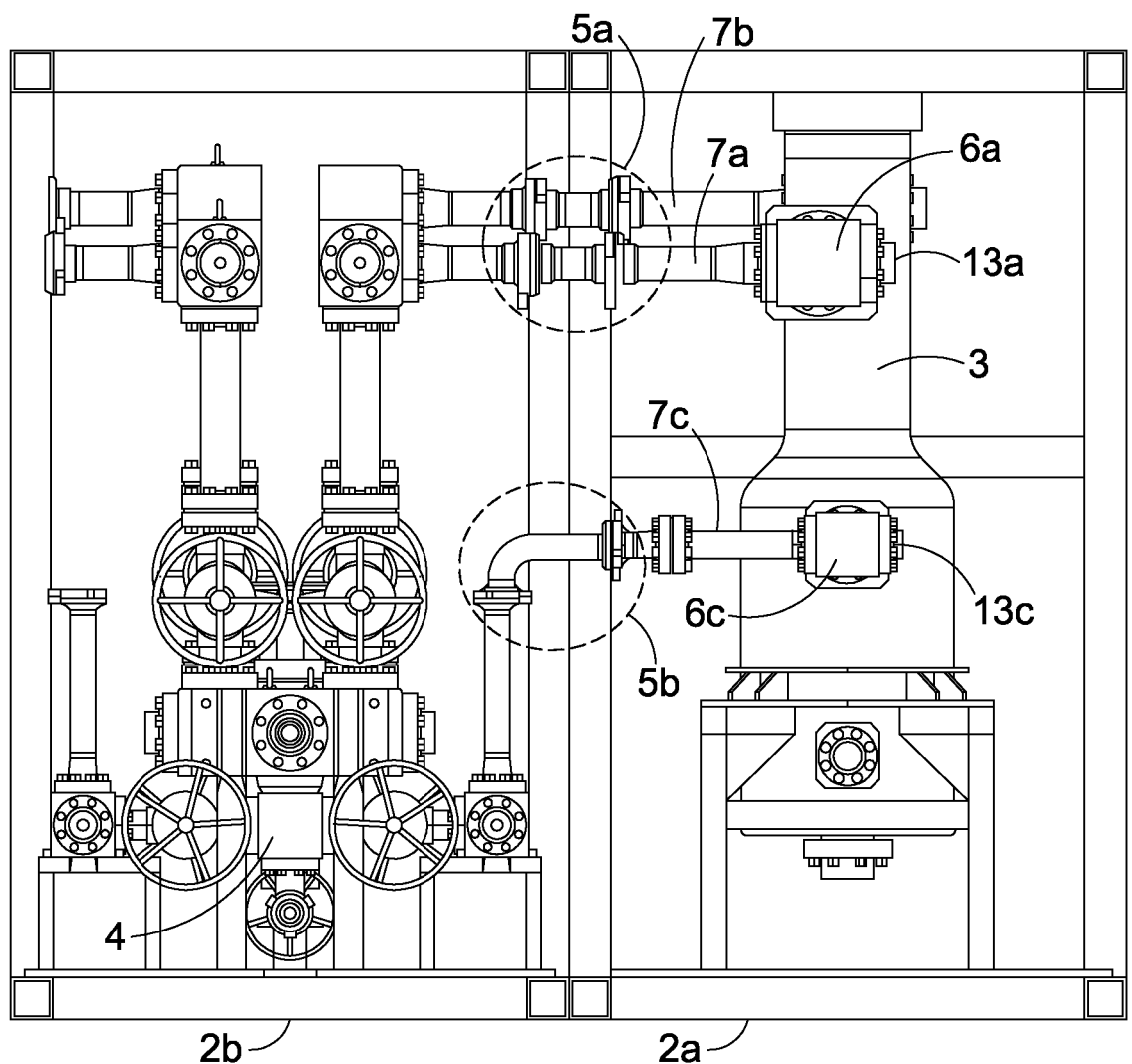
FIG. 9 is a schematic longitudinal sectional view showing reversed connection MPD vessel and central valve manifold with inter-skid connections in place.

FIGS. 7 and 8 show how the MPD vessel 3 is now able to be relocated and reattached to the other side of the central valve manifold 4. With reference to FIG. 9, the MPD vessel 3 is now attached to the central manifold 4 via the vessel inlet/outlet 7, manifold inlet/outlet 8 and inter-skid connections 5. Here, the vessel process inlet 7a is connected to the manifold process outlet 8a, the vessel process outlet 7b to the manifold process inlet 8b, the vessel flush water inlet 7c to the manifold flush water outlet 8c and the vessel slurry outlet 7d to the manifold slurry inlet 8d.

Due to the intrinsic maximum capacity limitations of both the sand filter and cyclonic filter units, there is often a desire to increase the capacity, or 'throughput', of production flow a desanding system is able to process.

Figure 10:
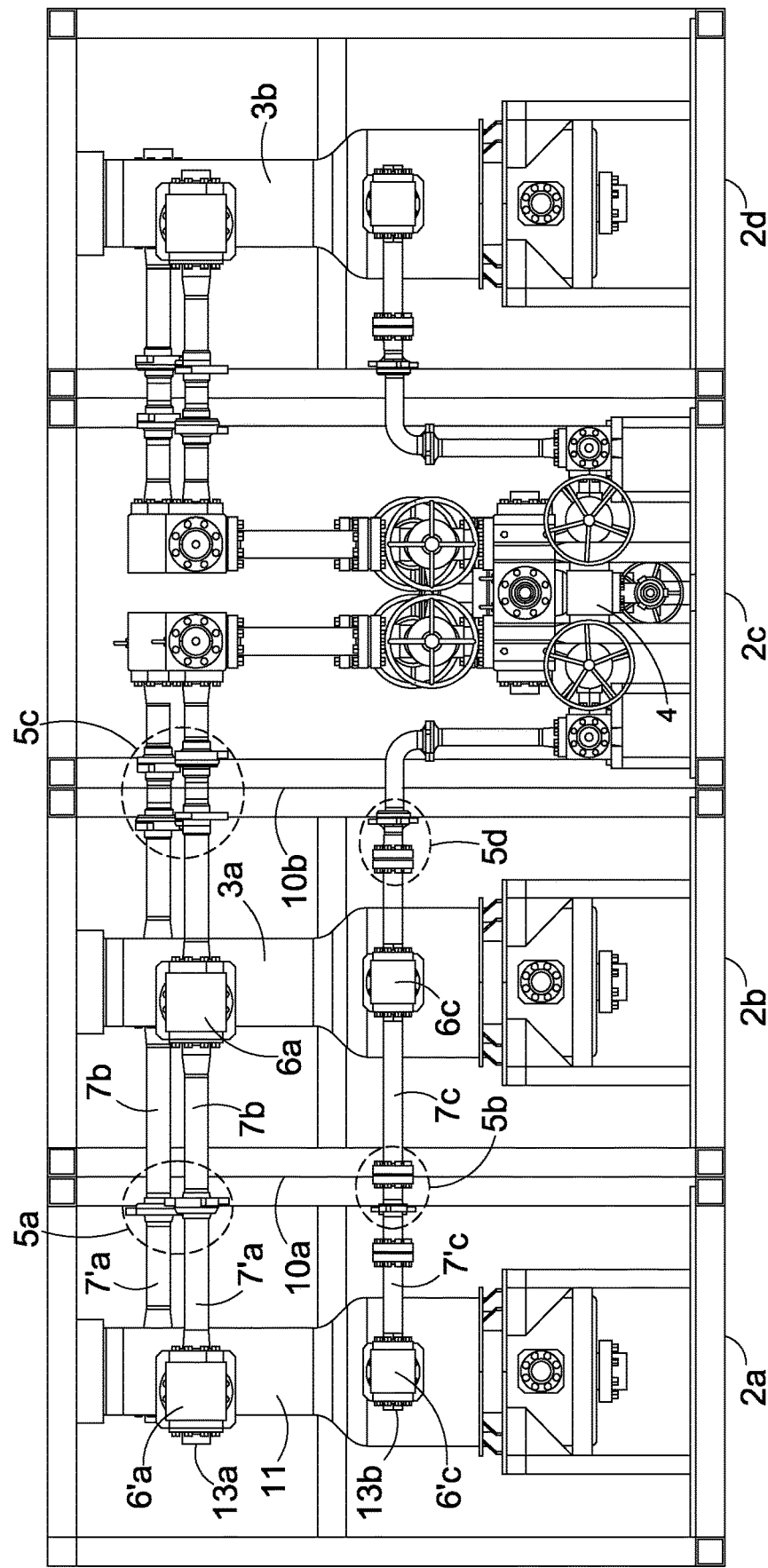
FIG. 10 is a schematic longitudinal sectional view showing a multi-skid design with an additional MPD vessel 'daisy-chained' onto the system using inter-skid connections.

FIG. 10 shows a schematic longitudinal sectional view according to another embodiment of the invention. The multi-skid system 1 now comprises an additional daisy-chained MPD vessel 11 which can be connected to one or both sides of the multi-skid system 1 via the MPD vessels 3; this is achieved, with the daisy-chained MPD vessel 11 already configured with all its vessel inlet/out connections 7' in place, by first removing the blind flanges 13 from the vessel connectors 6 and connecting an additional set of vessel inlet/outlet connections 7 to the remaining, now vacant aperture of the vessel connectors 6.

The vessel inlet/out connections 7 and daisy-chained vessel inlet/outlet connections 7' are connected together via an additional set of inter-skid connections 5. In this way, an additional daisy-chained MPD vessel 11 has now been successfully coupled to the multi-skid system 1 without the need for an additional set of valves. This process can be repeated to the other side of the multi-skid system 1 to ultimately allow for two, additional daisy-chained vessels 11 which are coupled to the multi-skid system 1. Furthermore, MPD vessels can be continued to be daisy-chained onto the most externally coupled MPD vessel up until the central valve manifold pipework flow velocity limits are reached.

Advantageously, the effect of daisy-chaining additional MPD vessels to the multi-skid system 1 in this way allows the system 1 to handle larger throughputs of production flow while increasing the solids holdup capacity during operation which reduces the required solids accumulator purging frequency of separated solids, as described previously. For conventional desanding systems to achieve a similar result, additional multi-skid systems would need to be manifolded in parallel to the original system requiring extensive, difficult and time consuming 'off-skid' pipework modifications to be implemented between the various systems where, the 'off-skid' pipework encompasses the pipework and connections required to be made in order to couple additional systems to the original system.

Figure 11:
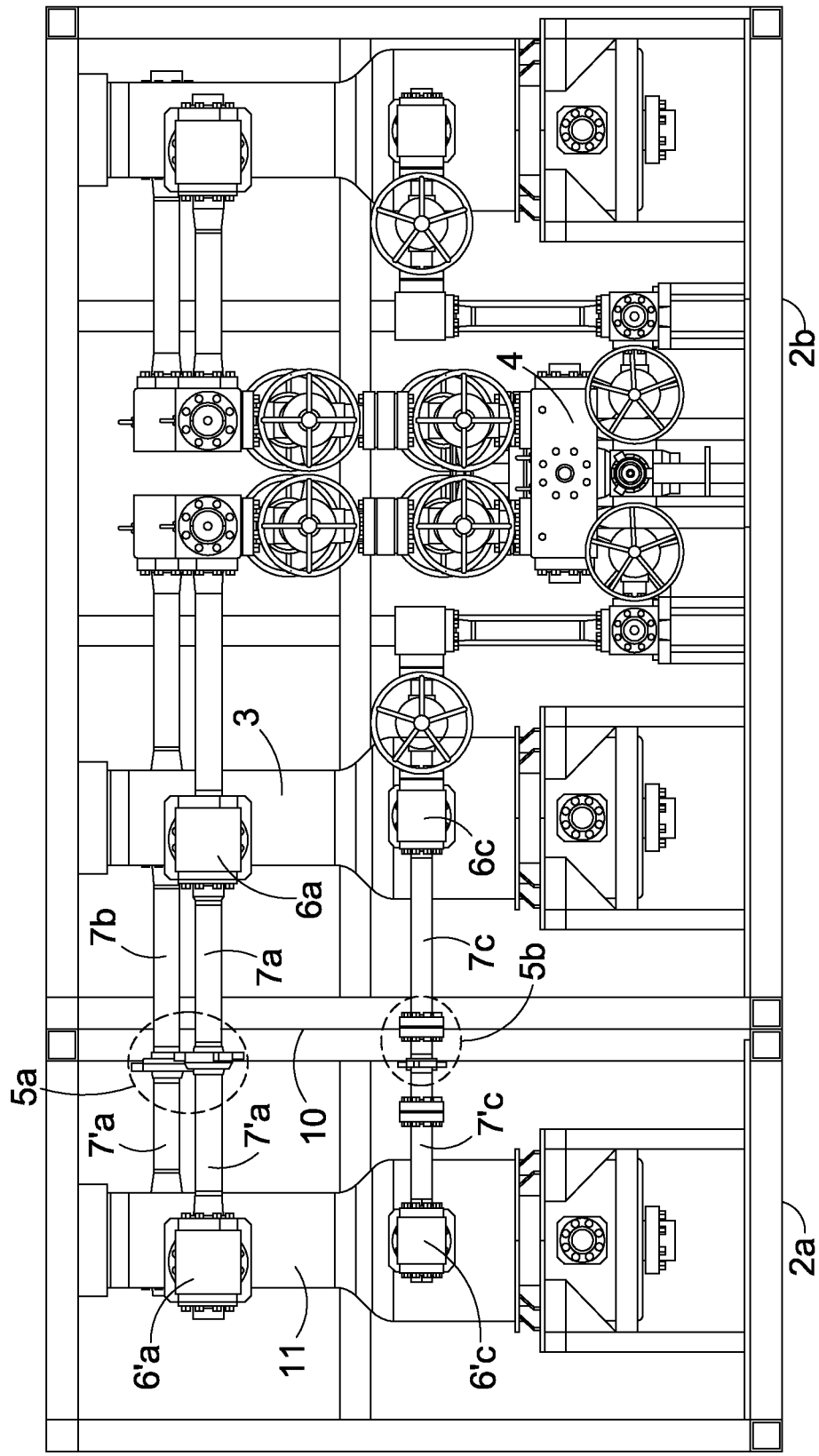
FIG. 11 is a schematic longitudinal sectional view showing a single skid design with an additional MPD vessel 'daisy-chained' onto the system using inter-skid connections.

FIG. 11 shows a schematic longitudinal sectional view according to another embodiment of the invention. Here, the daisy-chained MPD vessel 11 is now coupled to a single-skid system 12 design where, the single-skid system 12 differs from the multiple-skid system 1 in that the integral parts of the system, two MPD vessels 3 and central valve manifold 4, are now contained within a single skid 2b structure.

The single-skid system 12 offers a lighter overall weight system which requires less space to store, less time and resource to setup and operate than the multiple-skid system 1 when the latter system 1 is fully connected together. On the other hand, the multiple-skid system 1 allows for greater flexibly in storing and handling each individual skid element of the system; the multi-skid system also offers an alternative to applications which have limitations on the carrying capacities of the cranes used to manipulate these systems into place for subsequent use.

Figure 12:
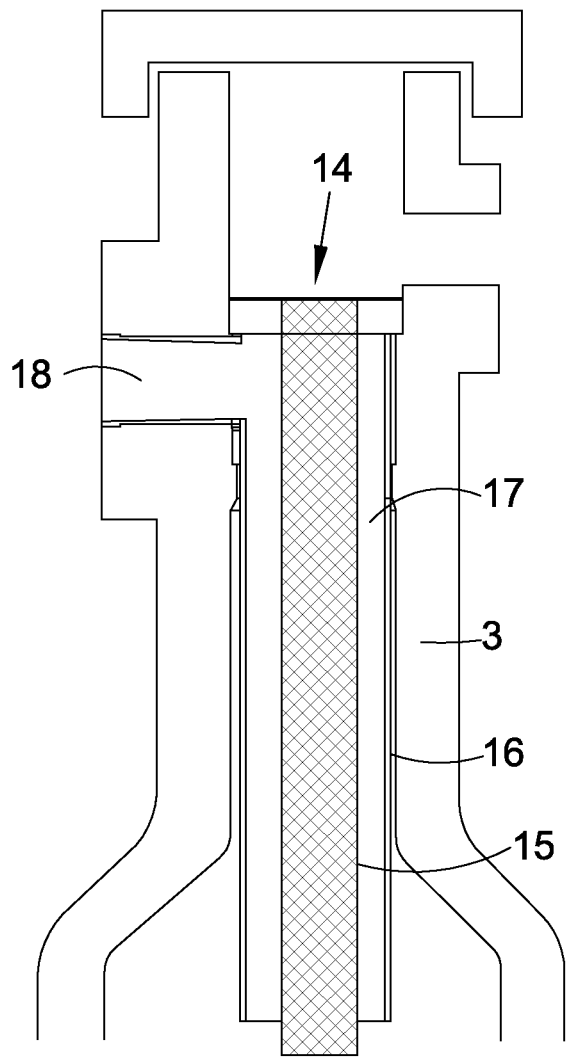
FIG. 12 is a side cross sectional view of the sand filter element showing the swirl zone.
Figure 13:
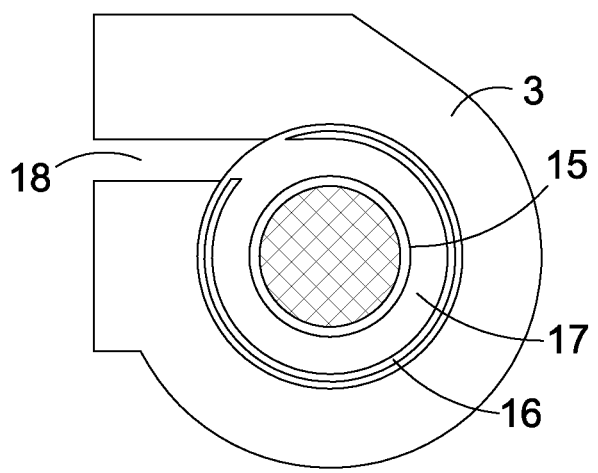
FIG. 13 is a plan view of the sand filter element showing the swirl zone.

With reference to FIGS. 12 and 13, a sand filter element 14 is mounted within and coupled to the MPD vessel 3, the sand filter element 14 now utilises a tangential inlet 18, connected to the process inlet connecter 7a and which is typically coupled with conventional sand cyclone elements, to improve the performance of the sand filter element 14. Here, the sand filter element 14 comprises a concentric outer cylinder, termed the swirl tube 16, which encloses the smaller diameter, inner concentric central filter screen 15. The annular cavity between the swirl tube 16 and filter screen 15 portions of the sand filter element 14 is called the swirl zone 17.

Production flow enters the MPD vessel 3, through the process inlet connector 7a and then tangential inlet 18, into the sand filter internal 14 which is then directed into the swirl zone 17.

The concentric nature of the swirl tube 16 of the sand filter element 14 causes the production flow to begin 'swirling' around the inner filter screen 15; this causes the larger solid particles to be forced radially outwards towards the inner surface of the swirl tube 16 by the centripetal forces whereby, the centripetal forces are created by the induced swirling flow within the swirl zone 17.

The separated large solid particles exit the swirl tube 16 via the bottom plane of the swirl tube 16 and settle in the integrated solids accumulator of the MPD vessel 3. Therefore, the swirl tube 16 permits a 'pre-treatment' process to the entire filtration process which significantly reduces the build-up of solids on the outer surface of the filter screen 15. This effect now increases the solid handling capacity of the sand filter element 14, compared with conventional, non-tangential inlet sand filter designs, while reducing the required purge frequency of the sand filter element 14.

The pre-treatment process afforded by the present invention occurs in a single step, within the sand filter element 14 structure, which differs from conventional pre-treatment methods which typically occur in two separate and distinct stages.

The invention claimed is:

1. Apparatus for a desanding system, the apparatus comprising:
   a central valve manifold fluidly coupled to a MultiPhase Desanding (MPD) vessel by a plurality of detachable inlet/outlet connections; and
   wherein the detachable connections are arranged to be reattached to the opposing side of the MPD vessel to allow for a uni-sided MPD vessel design which is coupleable to the valve manifold on either of its sides, without the need for integral pipework modifications, and wherein the detachable inlet/outlet connections are integrally mounted on the opposite sides of the MPD vessel such that all of the inlet/outlet connections are symmetrical in orientation, which allows the vessel to be coupled with connections on a second side which is opposite the first side.

2. Apparatus according to claim 1, wherein the MPD vessel has a process outlet which exits from the side of the MPD vessel.

3. Apparatus according to claim 2, wherein the MPD vessel has a top cover portion without pipework which allows for quick and easy access of a sand cyclone or a sand filter element mounted within the MPD vessel.

4. Apparatus according to claim 2, wherein the MPD vessel has internal sealing connections to accommodate the process outlet location.

5. Apparatus according to claim 4, wherein the internal modified sealing connections allow coupling commonality of the MPD vessel with sand filter or sand cyclone elements.

6. Apparatus according to claim 1, wherein the detachable inlet/outlet connections comprise a process inlet, a process outlet, a flush water inlet and a slurry outlet.

7. Apparatus according to claim 1, having a valve manifold and two of the vessels mounted together on a single skid, with the valve manifold between the vessels in a generally central location thereby allowing a duty/standby desanding, a parallel, or a serial operation.

8. Apparatus according to claim 1, wherein an additional MPD vessel is arranged to be coupleable to the MPD vessel without the need for an additional set of valving.

9. A method for reattaching the detachable inlet/outlet connections of the apparatus of claim 1, to the opposing side of the MPD vessel and thus, allowing the orientation of the MPD vessel to be inverted, comprising the steps of:
  a) detaching a process inlet connection from a process inlet connector;
  b) removing a blind flange from a sealed aperture of the process inlet connector to unseal the said aperture and thereby create a vacant aperture;
  c) sealing the previously connected aperture of the process inlet connector with the blind flange;
  d) connecting a shorter process inlet connection;
  e) repeating the steps, a-d for a process outlet connection with a corresponding process outlet connector but in step d, reconnecting the same process connection at the respective vacant aperture;
  f) repeating the steps, a-d for a flush water inlet with a corresponding flush water inlet connector but in step d, reconnecting the same flush water connection at the respective vacant aperture; and
  g) repeating the steps, a-d for a slurry outlet with a corresponding slurry outlet connector but in step d, reconnecting the same slurry connection at the respective vacant aperture.

10. A method for attaching together two of the MPD vessels of claim 1, comprising the steps of:
  a) from a first MPD vessel, removing a blind flange from a sealed aperture of a process inlet connector;
  b) attaching a process inlet connection to the process inlet connector of the first MPD vessel;
  c) repeating steps, a-b for a process outlet connection with a corresponding process outlet connector;
  d) repeating steps, a-b for a flush water inlet connection with a corresponding flush water inlet connector;
  e) repeating steps, a-b for a slurry outlet connection with a corresponding slurry outlet connector;
  f) aligning a second MPD vessel, which has its detachable inlet/out connections and blind flanges already connected, to the first MPD vessel such that both sets of connected inlet/outlet connections converge at skid interfaces between the two MPD vessels; and
  g) connecting both sets of inlet/outlet connections with inter-skid connections.

11. A uni-sided MultiPhase Desanding (MPD) vessel on a skid, arranged to be fluidly coupled to a further identical MPD vessel, having a pair of inlets located on opposite sides of the vessel at the same vertical height and a pair of outlets located on opposite sides of the vessel at the same vertical height.

12. A vessel as claimed in claim 11, arranged to house either a sand filter element or a sand cyclone element.

13. A vessel as claimed in claim 11, wherein the inlets and outlets in each respective pair are offset from the vertical axis of symmetry of the vessel in a forward or rearwards direction, by the same amount, which amount may include zero.

14. A vessel as claimed in claim 11, wherein one of each pair may be sealed with a blind flange.

15. A vessel as claimed in claim 11, coupled to a valve manifold.

16. A plurality of the MPD vessels of claim 11, fluidly coupled together in a daisy-chained configuration.

* * * * *